(12) United States Patent
Jenkins

(10) Patent No.: US 7,931,847 B2
(45) Date of Patent: Apr. 26, 2011

(54) INJECTION MOLDING OF PART HAVING NONUNIFORM THICKNESS

(75) Inventor: Kurt Allen Jenkins, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 12/548,147

(22) Filed: Aug. 26, 2009

(65) Prior Publication Data

US 2011/0049736 A1  Mar. 3, 2011

(51) Int. Cl.
B29C 45/56 (2006.01)
(52) U.S. Cl. .................... 264/328.7; 425/555
(58) Field of Classification Search ............ 264/328.7; 425/555
See application file for complete search history.

(56) References Cited

U.S. PATENT DOCUMENTS

| | | | |
|---|---|---|---|
| 4,447,372 A * | 5/1984 | Kreuttner | 264/2.2 |
| 5,044,925 A | 9/1991 | Watanabe | |
| 5,236,656 A | 8/1993 | Nakajima | |
| 5,658,522 A * | 8/1997 | Fischer | 264/328.7 |
| 5,989,471 A | 11/1999 | Lian et al. | |
| 6,398,988 B1 * | 6/2002 | Jenkins et al. | 264/2.2 |
| 6,579,485 B2 | 6/2003 | Smith et al. | |
| 7,069,974 B2 | 7/2006 | Rittner et al. | |
| 7,108,811 B2 * | 9/2006 | Summerer | 264/1.7 |
| 2005/0189665 A1 | 9/2005 | Nishigaki | |
| 2007/0083086 A1 | 4/2007 | LeVahn et al. | |
| 2008/0305339 A1 | 12/2008 | Kotaki | |

FOREIGN PATENT DOCUMENTS

| | | | |
|---|---|---|---|
| DE | 19517024 | * | 6/1996 |
| DE | 10115647 | * | 10/2002 |
| EP | 1939386 A1 | | 7/2008 |

OTHER PUBLICATIONS

"A Study of the Effects of Process Parameters for Injection Molding on Surface Quality of Optical Lenses", Retrieved at <<http://www.sciencedirect.com/science?_ob=ArticleURL&_udi=B6TGJ-4T8SKYX-1&_user=10&_rodc=1&_fmt=&_orig=search&_sort=d&view=c&_acct=C000050221&_verison=1&_urlVersion=0&_userid=10&md5=4129f009319400f6454fd6b3ff40bc48>>, vol. 209, Issue 7, Apr. 1, 2009, Journal of Materials Processing Technology, pp. 3.

* cited by examiner

Primary Examiner — Jill L Heitbrink
(74) Attorney, Agent, or Firm — Alleman Hall McCoy Russell & Tuttle LLP

(57) ABSTRACT

Injection molding of a part having a nonuniform thickness is provided. One disclosed embodiment of an injection molding device includes one or more side walls, a first mold surface intersecting the side walls and being stationary with respect to the side walls, and a second mold surface intersecting the side walls so as to define with the side walls and the first mold surface a cavity configured to receive a metered amount of injected molten thermoplastic material. The second mold surface is moveable toward the first mold surface in such a manner that a first end of the second mold surface moves a larger physical travel distance toward the first mold surface than does a second end of the second mold surface during a molding process.

20 Claims, 3 Drawing Sheets

INJECTION MOLDING OF PART HAVING NONUNIFORM THICKNESS

BACKGROUND

Injection molding is a manufacturing process that may be used for producing plastic parts. Injection molding generally involves injecting molten plastic into a mold, and then allowing the plastic to cool and solidify. However, many plastics shrink while cooling. Therefore, it may be challenging to manufacture parts of a precise thickness via injection molding. Further, because the magnitude of shrinkage is dependent upon the thickness of the plastic, various portions of a nonuniform plastic part may shrink at different rates, thereby compounding the difficulties in molding precision parts via injection molding.

SUMMARY

Various embodiments related to injection molding of a part having a nonuniform thickness are disclosed herein. For example, one disclosed embodiment provides an injection molding device comprising one or more side walls, a first mold surface intersecting the side walls and being stationary with respect to the side walls, and a second mold surface intersecting the side walls so as to define with the side walls and the first mold surface a cavity configured to receive a quantity of injected molten thermoplastic material. Further, the second mold surface is configured to be moveable toward the first mold surface in such a manner that a first end of the second mold surface moves a larger physical travel distance toward the first mold surface than does a second end of the second mold surface when molding the thermoplastic material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Injection molding of a part having a nonuniform thickness, such as an optical wedge, may be challenging in that materials used for such parts may shrink during solidification, thereby causing non-uniform shrinkage due to the varying thickness of the part. Shrinkage during molding of a uniform part may be compensated for by moving one surface of a mold toward another surface in a linear manner as the plastic cools and sets. However, in the case of a nonuniform part, such linear motion may not work, as thinner portions of the part that undergo less shrinkage may cause the mold to lock, and thereby not permitting further motion of the mold as the thicker portion of the part continues to set up. This may cause the final part to have incorrect dimensions, and also may impact reproducibility of the molded part.

Accordingly, injection molding of a part having a nonuniform thickness as described herein utilizes a mold surface configured to be moved toward another mold surfaced in a nonlinear manner (e.g. by allowing rotation of the mold surface about an axis) when molding the thermoplastic material. This allows the mold to continue to move in the case where a portion of the molded part spaced from the axis of mold rotation cures more slowly than a portion of the molded part located adjacent to the axis of mold rotation. Further, in some embodiments, the mold surface may be both linearly and rotatably movable with respect to another mold surface to allow different motion to occur during different phases of a cooling process. While the disclosed embodiments utilize a rotational mechanism to allow such nonlinear motion to occur, it will be understood that a mold according to the present disclosure may utilize any other suitable mechanism for nonlinear motion.

Figure 1:
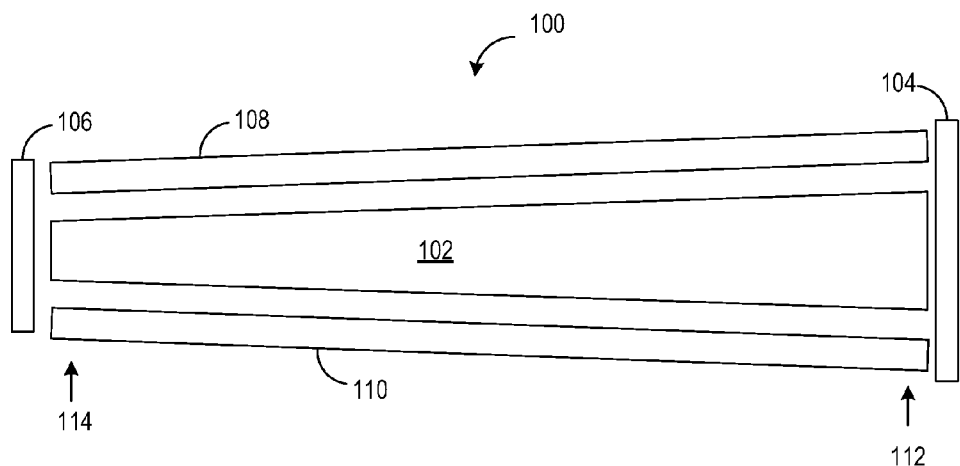
FIG. 1 shows an exploded view of an embodiment of an example injection molding device according to the present disclosure.
Figure 2:
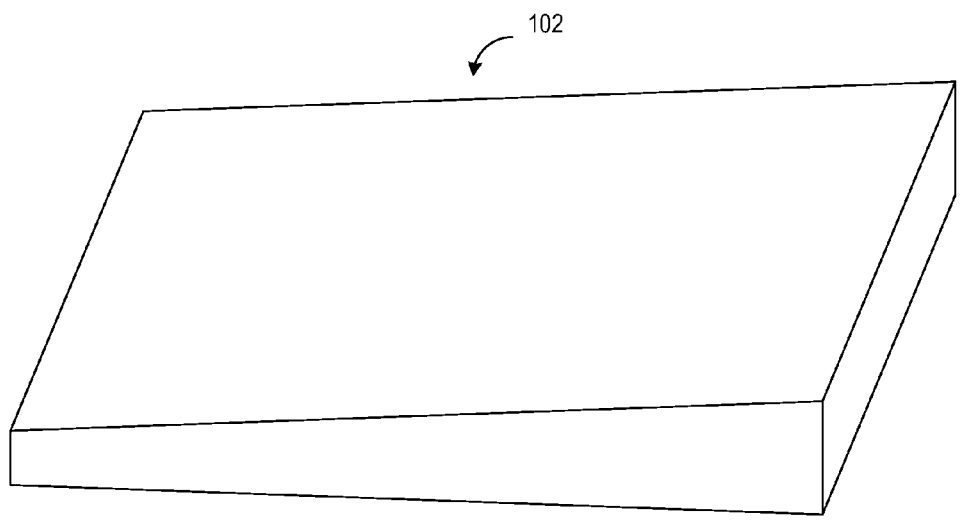
FIG. 2 shows a schematic depiction of an embodiment of a part having nonuniform thickness molded via the embodiment of FIG. 1.

FIG. 1 shows an exploded schematic view of an embodiment of an example injection molding device 100 that may be used for molding a part having a nonuniform thickness, such as example part 102, depicted schematically as an optical wedge and shown in perspective in FIG. 2. Returning to FIG. 1, injection molding device 100 may include a plurality of side walls, including side wall 104 and side wall 106, as well as side walls that intersect side walls 104 and 106 to form a rectangular structure. Injection molding device 100 further include major top and bottom surfaces (referring to the orientation of FIG. 1), which are referred to herein as a first mold surface 108 and a second mold surface 110. First mold surface 108 may intersect the side walls such as side wall 104 and side wall 106, and may be stationary with respect to the side walls. Second mold surface 110 may also intersect the side walls, such as side wall 104 and side wall 106, so as to define with the side walls and first mold surface 108 surface a cavity. Such a cavity may be configured to receive a quantity of injected molten thermoplastic material, which upon solidifying becomes part 102. As mentioned above, second mold surface 110 may be moveable toward the first mold surface 108 in such a manner that a first end 112 of second mold surface 110 moves a larger physical travel distance toward first mold surface 108 than does a second end 114 of second mold surface 110 when molding the thermoplastic material. Such a configuration will be described in more detail as follows with reference to FIGS. 3 and 4.

Figure 3:
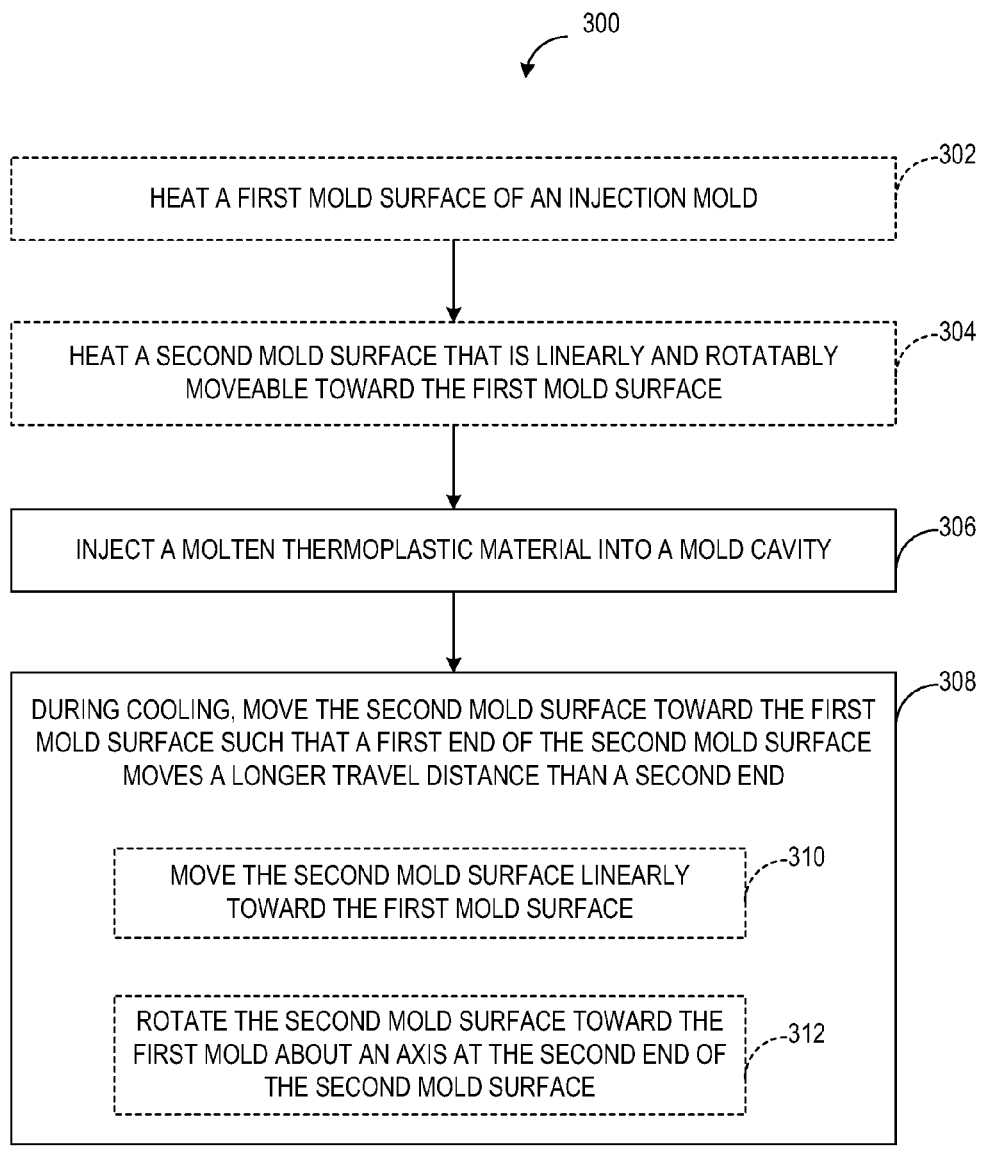
FIG. 3 shows a flow diagram of an embodiment of a method of injection molding a part having a nonuniform thickness.
Figure 4:
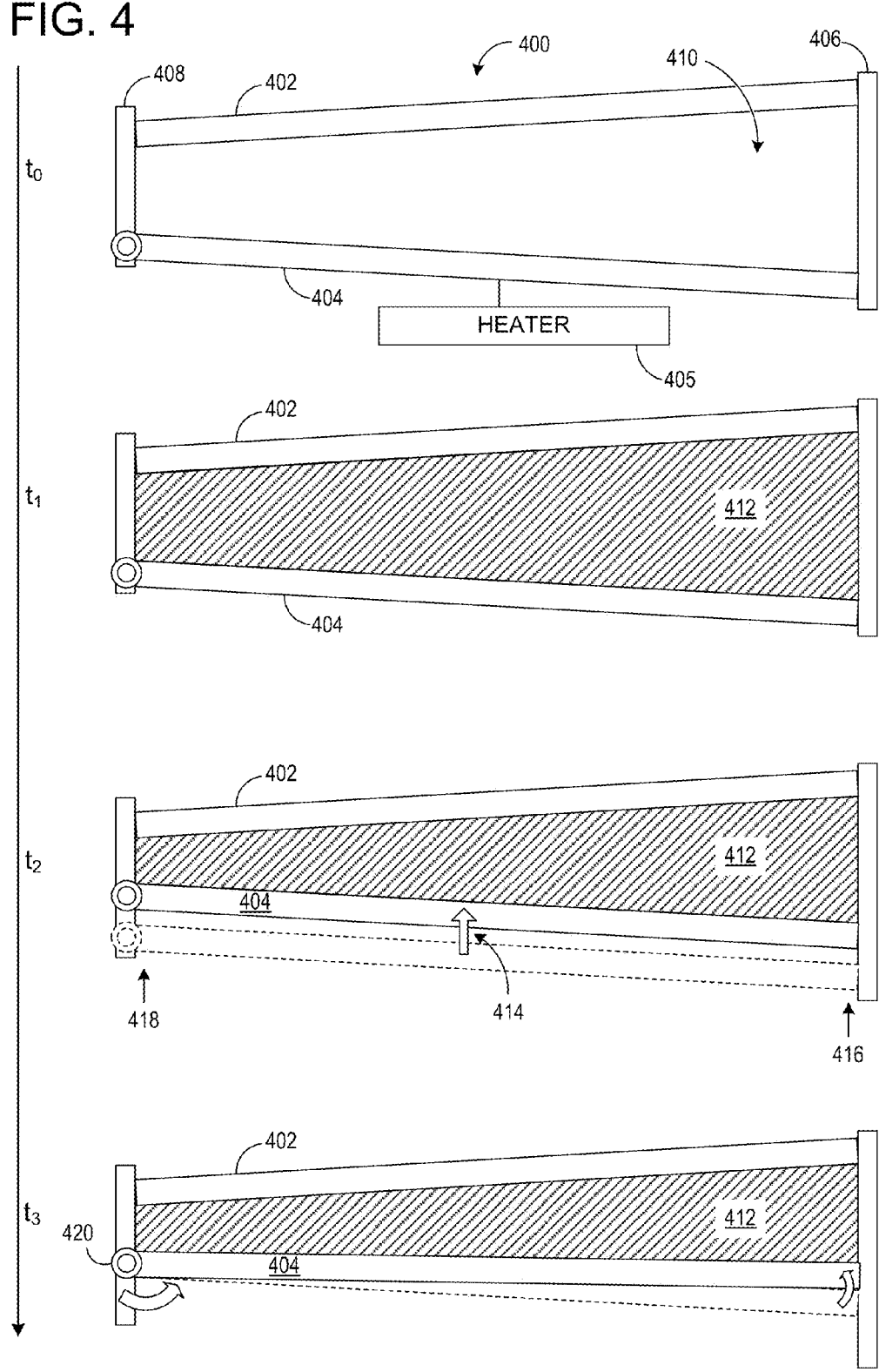
FIG. 4 shows a schematic depiction of a sequence of mold movements made during an embodiment of an injection molding process according to the present disclosure.

FIG. 3 shows a flow diagram of an embodiment of a method 300 of injection molding a part having a nonuniform thickness. First, method 300 may optionally include, at 302, heating a first mold surface of an injection mold such that plastic injected into the mold does not instantly start to harden on the first surface. Further, some embodiments of method 300 may optionally include, at 304, heating a second mold surface of the injection mold, where the second mold surface is linearly and rotatably moveable toward the first mold surface. FIG. 4, which shows a schematic depiction of a time sequence for an embodiment of injection molding of a part having a nonuniform thickness, shows examples of first and second mold surfaces respectively at 402 and 404. A heater is shown for surface 404 schematically at 405. The heater is not shown for surface 402, or other mold surfaces, for the purpose of clarity. It will be understood that other mold surfaces than surfaces 402 and 404, such as the side walls 406 and 408, also may be heated prior to injection of plastic into the mold.

Returning to FIG. 3, at 306 method 300 includes injecting a molten thermoplastic material into the mold cavity. In some embodiments, the mold cavity may be defined by a first mold surface, a second mold surface, and a plurality of sides extending between the first mold surface and the second mold surface, where the second mold surface being moveable toward the first mold surface. The thermoplastic material may be injected into the cavity in any suitable manner. For example, in some embodiments, the molten thermoplastic material may be injected through an opening in the second mold surface, while in other embodiments, the molten thermoplastic material may be injected into the mold at any other suitable location.

Referring again to FIG. 4, at time $t_1$, mold cavity 410 has been filled with thermoplastic material 412. Mold cavity 410 may be initially defined such that a thin end and a thick end of the molten plastic are thicker than desired for the component to accommodate the greater volume for the molten thermoplastic material relative to a hardened thermoplastic material. Then, as is described in more detail below, during cooling of the thermoplastic material, the second mold surface 404 is moved toward the first mold surface 402 to keep the mold surfaces in contact with the thermoplastic material as the material cools, thereby achieving desired dimensional and surface properties in the final molded part.

The thermoplastic material may be any suitable material. In the case of an optical wedge, the thermoplastic material may be transparent, and in more specific embodiments, may comprise a material such as poly(methyl methacrylate) (PMMA), polycarbonate and/or polycyclic olefin. It will be understood that these materials are presented for the purpose of example, and that any other suitable material may be used in any other suitable molding process.

As described above, one or more of the side walls, the first mold surface and the second mold surface may be heated prior to and/or while injecting the molten thermoplastic material. Such heating of the side walls and cavity surfaces may prevent the thermoplastic material from thermal shock upon injection.

Continuing with FIG. 3, at 308, method 300 includes, during cooling of the thermoplastic material in the mold cavity, moving the second surface toward the first mold surface such that a first end of the second mold surface moves a larger physical travel distance than does a second end of the second mold surface, thereby forming the part having the nonuniform thickness. In some embodiments, as indicated at 310 and 312, respectively, 308 of method 300 may include linearly moving and rotatably moving (i.e. rotating) the second mold surface toward the first mold surface, either simultaneously or during different phases of a molding process. The term "linearly moving the second mold surface toward the first mold surface" refers to movement of the second mold surface such that a first end of the second mold surface moves a same physical travel distance as does a second end of the second mold surface. As an example, at time $t_2$ FIG. 4 illustrates at 414 linear compression being applied to the second mold surface 404 in a direction toward first mold surface 402, such that a first end 416 of the second mold surface 404 and a second end 418 of the second mold surface 404 move approximately a same physical travel distance toward first mold surface 402. In some embodiments, injection molding device 400 may include a physical stop to limit an amount of physical travel distance of the second mold surface so that second mold surface 404 may be linearly moved toward first mold surface 402 for a portion of its travel path toward first mold surface 402. While the second mold surface 404 that is movable toward the stationary first mold surface is depicted as comprising an entire bottom side of the mold cavity (referring to the orientation of the mold shown in FIG. 4), it will be understood that in some embodiments, the second mold surface may comprise only a portion of a side of the mold cavity.

Continuing with FIG. 4, after a predetermined distance of travel of second mold surface 404, at time $t_3$ the second mold surface 404 is rotatably moved toward first mold surface 402 about an axis at the second end 418 of second mold surface 404. As such, first end 416 of second mold surface 404 moves a larger physical travel distance than does the second end 418 of second mold surface 404.

Second mold surface 404 may be rotated in any suitable manner. For example, injection molding device 400 may include a hinge 420 about which second mold surface 404 may rotate. Such a hinge 420 may be coupled to one or more sidewalls such as side wall 408, and may allow at least a portion of the second mold surface 404 to rotate about an axis at the second end 418 of second mold surface 404. It will be understood that the term "hinge" as used herein comprises hinges, pivots, and other such rotational couplings of two parts.

Thus, as shown in FIG. 4, linear movement of second mold surface 404 toward first mold surface 402 as illustrated at $t_1$ may be used to achieve a desired thickness at a thin end of the part. Then, as illustrated at $t_2$, second mold surface 404 may then be rotatably moved toward first mold surface 402 to achieve a desired thickness at the thick end of the part. Upon doing so, the final part has the desired nonuniform thickness. Thus, although plastics may shrink by a volume fraction while cooling, injection molding as described herein allows for precisely controlling of the various thickness of a part by linearly and rotatably moving the second mold surface toward the first mold surface in a controlled manner so that the mold provides compressive force to the entire part during its entire cooling cycle.

An injection molding machine may be configured to move second mold surface 404 toward first mold surface 402 in any suitable manner. For example, in some embodiments, a molding machine to which the injection molding device 400 is coupled may include a compression core configured to move the second mold surface toward the first mold surface. Such a compression core may include a cam mechanism, hydraulic cylinders, gear rack and pinion, or any other suitable mechanism for moving the second mold surface.

As mentioned above, injection molding as described herein may be used to create an optical wedge that may be used as a light-guide in a large display, or may be used in a smaller form factor suitable for an interactive keyboard, mouse or webcam, or in any other suitable device. Such an optical wedge may also be used as a backlight for a liquid crystal display (LCD). Some optical wedges may comprise a Fresnel lens formed in one side of the wedge to focus and redirect light entering the wedge from a light/air interface of the wedge. Therefore, in this case, one of the side walls of the injection molding device may comprise a Fresnel lens molding surface configured to form such a Fresnel lens in the optical wedge. Further, in order to achieve a desired smoothness for the surface of a precision molded object, such as a light guide, one or more of the side walls and cavity surfaces of the injection molding device may be diamond-lapped, or may be formed from another process suitable for making highly smooth surfaces.

While disclosed herein in the context of an optical wedge, it should be understood that the embodiments herein are illustrative and not restrictive, since the scope of the invention is defined by the appended claims rather than by the descrip-

The invention claimed is:

1. An injection molding device for molding a part having a nonuniform thickness, the injection molding device comprising:
one or more side walls;
a first mold surface intersecting the one or more side walls and being stationary with respect to the one or more side walls; and
a second mold surface intersecting the one or more side walls so as to define with the one or more side walls and the first mold surface, a closed cavity configured to receive a metered amount of injected molten thermoplastic material, the second mold surface being moveable toward the first mold surface via linear motion during a first molding phase and via rotational motion during a second molding phase, wherein the linear motion comprises the second mold surface moving linearly toward the first mold surface in such a manner that a first end of the second mold surface moves a same physical travel distance as does a second end of the second mold surface while maintaining the closed cavity, and wherein the rotational motion comprises the second mold surface moving toward the first mold surface in such a manner that the first end of the second mold surface moves a larger physical travel distance toward the first mold surface than does the second end of the second mold surface while maintaining the closed cavity when molding the thermoplastic material.

2. The injection molding device of claim 1, further comprising a physical stop configured to stop movement of the second mold surface toward the first mold surface.

3. The injection molding device of claim 1, wherein the second mold surface is rotatably moveable toward the first mold surface about an axis located at the second end of the second mold surface.

4. The injection molding device of claim 1, wherein the second mold surface is configured to be linearly moved toward the first mold surface for a portion of a travel path relative to the first mold surface.

5. The injection molding device of claim 4, further comprising a hinge coupling a portion of the second mold surface to one of the side walls, the hinge allowing the portion of the second mold surface to rotate about an axis at a second end of the portion of the second mold surface.

6. The injection molding device of claim 1, further comprising one or more heaters for heating the one or more side walls, the first mold surface, and/or the second mold surface.

7. The injection molding device of claim 1, coupled to a molding machine, the molding machine including a compression core configured to move the second mold surface toward the first mold surface.

8. The injection molding device of claim 7, wherein the injection molding device is configured to form an optical wedge, and wherein a side wall of the injection molding device comprises a Fresnel lens molding surface.

9. A method of injection molding a part having a nonuniform thickness, the method comprising:
injecting a molten thermoplastic material into a closed mold cavity, the closed mold cavity being defined by a first mold surface, a second mold surface, and a plurality of sides extending between the first mold surface and the second mold surface, the second mold surface being moveable toward the first mold surface via linear motion and rotational motion;
during a first cooling phase of the thermoplastic material in the closed mold cavity, moving the second mold surface toward the first mold surface such that a first end of the second mold surface moves a same physical travel distance as does a second end of the second mold surface, while maintaining the closed mold cavity; and
after the first cooling phase and during a second cooling phase of the thermoplastic material in the closed mold cavity, moving the second mold surface toward the first mold surface such that the first end of the second mold surface moves a larger physical travel distance than does the second end of the second mold surface, while maintaining the closed mold cavity, thereby forming the part having the nonuniform thickness.

10. The method of claim 9, wherein the thermoplastic material is optically transparent.

11. The method of claim 10, wherein the thermoplastic material comprises poly(methyl methacrylate).

12. The method of claim 10, wherein the thermoplastic material comprises polycarbonate.

13. The method of claim 10, wherein the thermoplastic material comprises polycyclic olefin.

14. The method of claim 9, further comprising heating one or more of the sides, the first mold surface, and the second mold surface during a molding process.

15. The method of claim 14, wherein the one or more of the sides, the first mold surface, and the second mold surface are heated prior to injecting the molten thermoplastic material.

16. The method of claim 14, wherein the one or more of the sides, the first mold surface, and the second mold surface are heated while injecting the molten thermoplastic material.

17. The method of claim 9, wherein moving the second mold surface during the first cooling phase includes linearly moving the second mold surface toward the first mold surface, and wherein after a predetermined distance of travel of the second mold surface, moving the second mold surface during the second cooling phase comprises rotating the second mold surface toward the first mold surface about an axis at the second end of the second mold surface.

18. The method of claim 9, wherein the part having the nonuniform thickness is an optical wedge and wherein the method further comprises molding a Fresnel structure into an end of the optical wedge.

19. A method of injection molding of a part having a nonuniform thickness, the method comprising:
heating a first mold surface of an injection mold;
heating a second mold surface of the injection mold, the second mold surface being linearly and rotatably moveable toward the first mold surface;
injecting a metered amount of a molten optically-transparent thermoplastic material through an opening in the second mold surface into a closed cavity formed by the first mold surface and the second mold surface;
during cooling of the optically-transparent thermoplastic material, moving the second mold surface linearly toward the first mold surface such that a first end of the second mold surface moves a same physical travel distance as does a second end of the second mold surface while maintaining the closed cavity; and
after a predetermined distance of travel of the second mold surface, rotating the second mold surface toward the first mold surface about an axis at the second end of the second mold surface such that the first end of the second mold surface moves a larger physical travel distance than does the second end of the second mold surface while maintaining the closed cavity.

20. The method of claim 19, wherein rotating the second mold surface toward the first mold surface comprises rotating the second mold surface about a hinge at the second end of the second mold surface.

* * * * *